US010485256B2

(12) United States Patent
Shi et al.

(10) Patent No.: US 10,485,256 B2
(45) Date of Patent: Nov. 26, 2019

(54) STEVIA SWEETENER WITH IMPROVED SOLUBILITY WITH A CYCLODEXTRIN

(71) Applicant: EPC Natural Products Co., Ltd., Beijing (CN)

(72) Inventors: Jingang Shi, Beijing (CN); Samil Ozavar, West Milford, NJ (US); Hansheng Wang, Beijing (CN)

(73) Assignee: SWEET GREEN FIELDS INTERNATIONAL CO., LIMITED, Kowloon (HK)

( * ) Notice: Subject to any disclaimer, the term of this patent is extended or adjusted under 35 U.S.C. 154(b) by 0 days.

(21) Appl. No.: 14/744,006

(22) Filed: Jun. 18, 2015

(65) Prior Publication Data

US 2015/0366253 A1 Dec. 24, 2015

Related U.S. Application Data

(60) Provisional application No. 62/014,732, filed on Jun. 20, 2014.

(51) Int. Cl.
  *A23L 27/30* (2016.01)

(52) U.S. Cl.
  CPC .................................. *A23L 27/36* (2016.08)

(58) Field of Classification Search
  USPC ................................................ 426/548, 658
  See application file for complete search history.

(56) References Cited

U.S. PATENT DOCUMENTS

| | | | |
|---|---|---|---|
| 3,529,602 A | 9/1970 | Hind et al. | |
| 3,703,177 A | 11/1972 | Hind et al. | |
| 4,079,742 A | 3/1978 | Norman et al. | |
| 4,082,858 A | 4/1978 | Morita et al. | |
| 4,353,889 A | 10/1982 | DuBois | |
| 4,361,697 A | 11/1982 | Dobberstein et al. | |
| 4,612,942 A | 9/1986 | Dobberstein et al. | |
| 4,892,938 A | 1/1990 | Giovanetto | |
| 5,112,610 A | 5/1992 | Kienle | |
| 5,962,678 A | 10/1999 | Payzant et al. | |
| 5,972,120 A | 10/1999 | Kutowy et al. | |
| 6,096,870 A | 8/2000 | Mozaffar et al. | |
| 7,238,379 B2 | 7/2007 | Lang | |
| 7,923,552 B2 | 4/2011 | Jackson et al. | |
| PP22,593 P3 | 3/2012 | Garnighian | |
| 8,153,563 B2 | 4/2012 | Morgan et al. | |
| 8,257,948 B1 | 9/2012 | Markosyan | |
| PP23,164 P3 | 11/2012 | Alvarez Britos | |
| 8,318,459 B2 | 11/2012 | Markosyan | |
| 8,367,138 B2 | 2/2013 | Prakash et al. | |
| 2003/0138538 A1 | 7/2003 | Kitazume et al. | |
| 2003/0139610 A1 | 7/2003 | Khare et al. | |
| 2006/0083838 A1 | 4/2006 | Jackson et al. | |
| 2006/0134292 A1 | 6/2006 | Abelyan et al. | |
| 2006/0142555 A1 | 6/2006 | Jonnala et al. | |
| 2007/0003679 A1* | 1/2007 | Shimizu .................. A23L 27/36 426/548 |
| 2007/0082103 A1 | 4/2007 | Magomet et al. | |
| 2007/0116823 A1 | 5/2007 | Prakash et al. | |
| 2007/0116835 A1 | 5/2007 | Prakash et al. | |
| 2007/0128311 A1 | 6/2007 | Prakash et al. | |
| 2007/0292582 A1 | 12/2007 | Prakash et al. | |
| 2008/0026111 A1 | 1/2008 | Bellody et al. | |
| 2008/0292775 A1* | 11/2008 | Prakash .................. A23L 27/36 426/658 |
| 2008/0300402 A1 | 12/2008 | Yang et al. | |
| 2010/0099857 A1 | 4/2010 | Evans | |
| 2010/0112156 A1 | 5/2010 | Abelyan et al. | |
| 2010/0137569 A1 | 6/2010 | Prakash et al. | |
| 2010/0316782 A1 | 12/2010 | Shi et al. | |
| 2011/0195161 A1* | 8/2011 | Upreti ...................... A23L 2/52 426/103 |
| 2012/0058236 A1 | 3/2012 | Fosdick et al. | |
| 2012/0058247 A1 | 3/2012 | Shi | |
| 2012/0090062 P1 | 4/2012 | Alvarez Britos | |
| 2012/0090063 P1 | 4/2012 | Alvarez Britos | |
| 2012/0184500 A1 | 7/2012 | Goralczyk et al. | |
| 2012/0214751 A1 | 8/2012 | Markosyan | |
| 2012/0214752 A1 | 8/2012 | Markosyan | |
| 2012/0269954 A1 | 10/2012 | Bridges et al. | |
| 2012/0282389 A1 | 11/2012 | Purkayastha et al. | |
| 2012/0301589 A1 | 11/2012 | Markosyan | |
| 2013/0071537 A1 | 3/2013 | Shi et al. | |
| 2013/0274351 A1 | 10/2013 | Markosyan et al. | |

FOREIGN PATENT DOCUMENTS

| | | |
|---|---|---|
| AU | 2004/202670 | 1/2005 |
| CA | 2 185 496 | 3/1998 |
| CN | 1192447 | 9/1998 |
| CN | 1238341 | 12/1999 |
| CN | 1243835 | 2/2000 |
| CN | 101220062 | 7/2001 |

(Continued)

OTHER PUBLICATIONS

Upreti M. Int J Mol Sci 2011, 12 7529-7553.*
Abou-Arab, et al., "Physico-chemical assessment of natural sweeteners steviosides produced from *Stevia rebaudiana* bertoni plant", African J. Food Sci., May 2010, vol. 4, No. 5, pp. 269-281.
Brandle, et al., "Steviol glycoside biosynthesis", Phytochemistry. 2007, No. 68(14), pp. 1855-1863.
Crammer, B. and Ikan, R. "Progress in the chemistry and properties of rebaudiosides," In Developments in Sweeteners—3, T.H. Grenby (ed), Elsevier Applied Science, London, pp. 45-64 (1987).
Makapugay, et al., "Improved high-performance liquid chromatographic separation of the Stevia rebaudiana sweet diterpene glycosides using linear gradient elution", Journal of Chromatography, No. 283, 1984, pp. 390-395.
Serajuddin, "Salt Formation to Improve Drug Solubility", Advance Drug Delivery Reviews, No. 59, 2007, pp. 603-616.
Shibata, et al. Glucosylation of Steviol and Steviol-Glucosides in Extracts from Stevia rebaudiana Bertoni, Plant Physiol. 1991, vol. 95, pp. 152-156.

(Continued)

*Primary Examiner* — Subbalakshmi Prakash
(74) *Attorney, Agent, or Firm* — Michael X. Ye; Morris, Manning & Martin, LLP

(57) ABSTRACT

The invention describes a *stevia* based sweetener/cyclodextrin complex with improved solubility and/or taste in an aqueous solution for convenience of use in the food and beverage industry.

4 Claims, No Drawings

(56) References Cited

FOREIGN PATENT DOCUMENTS

| CN | 1078217 C | 1/2002 |
|---|---|---|
| CN | 1535607 | 10/2004 |
| CN | 101062078 | 10/2007 |
| CN | 101200480 | 6/2008 |
| CN | 101330833 | 12/2008 |
| CN | 101472487 | 7/2009 |
| CN | 101662955 | 3/2010 |
| CN | 101801177 | 8/2010 |
| CN | 101854814 | 10/2010 |
| CN | 103 079 411 | 5/2013 |
| EP | 2 215 914 | 8/2010 |
| EP | 2 415 358 | 2/2012 |
| EP | 2 428 123 | 3/2012 |
| EP | 2 456 450 | 5/2012 |
| EP | 2 457 450 | 5/2012 |
| EP | 2 460 419 | 6/2012 |
| EP | 2 486 806 | 8/2012 |
| FR | 2 968 170 | 6/2012 |
| JP | 52-023100 | 2/1977 |
| JP | 52-062300 | 5/1977 |
| JP | 54-041898 | 4/1979 |
| JP | 54-041899 | 4/1979 |
| JP | 54-041900 | 4/1979 |
| JP | 55-092400 | 7/1980 |
| JP | 56-121453 | 9/1981 |
| JP | 56-121454 | 9/1981 |
| JP | 56-121455 | 9/1981 |
| JP | 57-086264 | 5/1982 |
| JP | 58-101660 | 6/1983 |
| JP | 59120073 | 11/1984 |
| JP | S 60 188035 | 9/1985 |
| JP | 62-146599 | 6/1987 |
| JP | 63-173531 | 7/1988 |
| JP | 2-261359 | 10/1990 |
| JP | 6-192283 | 7/1994 |
| JP | 7-143860 | 6/1995 |
| JP | 7-177862 | 7/1995 |
| JP | 08-000214 | 1/1996 |
| JP | 08-325156 | 10/1996 |
| JP | 11-243906 | 9/1999 |
| JP | 2002-45145 | 2/2002 |
| JP | 2002-262822 | 9/2002 |
| JP | 2004-344071 | 12/2004 |
| JP | 2012-005483 | 1/2012 |
| JP | 2012-090629 | 5/2012 |
| KR | 1996-0016568 | 12/1996 |
| KR | 2004-0026747 | 4/2004 |
| WO | WO 0015049 A1 * | 3/2000 | ............... A23G 4/14 |
| WO | WO 00/49895 | 8/2000 |
| WO | WO 2003/003994 | 1/2003 |
| WO | WO 03-033097 | 4/2003 |
| WO | WO 06-038221 | 4/2006 |
| WO | WO 06-045023 | 4/2006 |
| WO | WO 06-072921 | 7/2006 |
| WO | WO 2006095366 | 9/2006 |
| WO | WO 2007/061810 | 5/2007 |
| WO | WO 2007/061898 A1 | 5/2007 |
| WO | WO 2008/057968 | 5/2008 |
| WO | WO 2008/091547 | 7/2008 |
| WO | WO 2008/147725 | 12/2008 |
| WO | WO 2009/086049 A2 | 7/2009 |
| WO | WO 2009/140394 A1 | 11/2009 |
| WO | WO 2010/150930 | 12/2010 |
| WO | WO 2011/059954 | 5/2011 |
| WO | WO 2011/094423 | 8/2011 |
| WO | WO 2011/161027 | 12/2011 |
| WO | WO 2012/031879 | 3/2012 |
| WO | WO 2012/006742 | 5/2012 |
| WO | WO 2012/057575 | 5/2012 |
| WO | WO 2012/068457 | 5/2012 |
| WO | WO 2012/073121 A2 | 6/2012 |
| WO | WO 2012/082677 | 6/2012 |
| WO | WO 2012/089861 | 7/2012 |
| WO | WO 2012/102769 | 8/2012 |
| WO | WO 2012/108894 | 8/2012 |
| WO | WO 2012/109506 | 8/2012 |
| WO | WO 2012/109585 | 8/2012 |
| WO | WO 2012/112177 | 8/2012 |
| WO | WO 2012/112180 | 8/2012 |
| WO | WO 2012/134502 | 10/2012 |
| WO | WO 2012/153339 | 11/2012 |
| WO | WO 2012/166163 | 12/2012 |
| WO | WO 2012/166164 | 12/2012 |
| WO | WO 2013/036366 | 3/2013 |
| WO | WO 2013036366 A1 * | 3/2013 | ............ A23L 1/2363 |
| WO | WO 2013/123281 | 8/2013 |

OTHER PUBLICATIONS

Upreti, et al. "Solubility Enhancement of Steviol Glycosides and Characterization of Their Inclusion Complex with Gamma-Cyclodextrin", Int. J. Mol. Sci. Nov. 2011, vol. 12, pp. 7529-7553.
International Search Report from related PCT Application PCT/IB2011/002636, dated Apr. 12, 2012, 3 pages.
International Search Report from PCT/US2012/029613, dated Feb. 1, 2013, 3 pages.
International Preliminary Report on Patentability from related PCT Application PCT/IB2011/002636, dated Feb. 26, 2013, 5 pages.
International Search Report from PCT/US2008/000700, dated Jul. 31, 2008, 5 pages.
International Search Report from PCT/IB2010/003045, dated May 5, 2011, 4 pages.
International Search Report and Written Opinion from PCT/IB2011/003351, dated Jul. 26, 2012, 5 pages.
International Search Report and Written Opinion from PCT/IB2010/001636, dated Dec. 2, 2010, 4 pages.
Extended European Search Report from related European Application No. 12756924.2, dated Feb. 6, 2015, 6 pages.
Extended European Search Report from related European Application No. 11844323.3, dated Feb. 11, 2015, 8 pages.
Extended European Search Report from related PCT Application PCT/IB2010/003045, dated May 6, 2013, 5 pages.
Extended European Search Report from related European Application No. 10789086.5, dated Jun. 6, 2014, 12 pages.
Prakash, et al., "Development of rebiana, a natural, non-caloric sweetener", Food and Chemical Toxicology, No. 46(7), 2008, pp. S75-S82.
International Search Report and Written Opinion from PCT/IB2015/053685, dated Sep. 24, 2015, 14 pages.
Kasai, et al., "Synthesis of Sweet Diterpene-Glycoside of Leaves of Stevia: rebaudiosides-A, -D, -E and their relating glycosides as well as Relationship between their Sweetness and Chemical Structure", Journal of Chemical Society of Japan, No. 5, 1981, pp. 726-735.
Kinghorn, et al., "Studies to Identify, Isolate, Develop and test Naturally Occurring Noncariogenic Sweeteners that May be Used as Dietary Sucrose Substitutes", Government Reports and Announcements Index, United States, Chemical Abstracts, 1985, 35 pages.
Kolb, et al., "Analysis of Sweet Diterpene Glycosides from Stevia rebaudiana: Improved HPLC Method", Journal of Agricultural Food Chemistry, vol. 49, 2001, pp. 4538-4541.
Ohtani, et al., "Methods to Improve the Taste of the Sweet Principles of Stevia Rebaudiana", Stevia, The Genus Stevia, Edited by A. Douglas Kinghorn, CRC Press, Print ISBN 978-0-415-26830-1, 2001, pp. 138-159.
Sharma, et al., "Chemistry and in vivo profile of ent-kaurene glycosides of Stevia rebaudianna Bertoni—An overview", Natural Product Radiance, vol. 8(2), 2009, pp. 181-189.
Tanaka, "Improvement of Taste of Natural Sweeteners", Pure & Appl. Chem., vol. 69, No. 4, 1997, pp. 675-683.
Loftsson, T. et al., "Evaluation of Cyclodextrin Solubilization of Drugs", International Journal of Pharmaceutics, Elsevier, Amsterdam, NL, vol. 302, No. 1-2, Sep. 30, 2005, pp. 18-28.
Loftsson, T. et al., "Self-Association and Cyclodextrin Solubilization of drugs", Journal of Pharmaceutical Sciences, American

(56) References Cited

OTHER PUBLICATIONS

Chemical Society and American Pharmaceutical Association, vol. 91, No. 11, Nov. 1, 2002, pp. 2307-2316.

* cited by examiner

STEVIA SWEETENER WITH IMPROVED SOLUBILITY WITH A CYCLODEXTRIN

CROSS REFERENCE TO RELATED APPLICATIONS

This application claims the priority date of U.S. Provisional Patent Application No. 62/014,732, filed Jun. 20, 2014, the disclosure of which is incorporated by reference herein in its entirety.

FIELD OF THE INVENTION

The present invention generally relates to *stevia* sweetener with improved long term solubility.

BACKGROUND OF THE INVENTION

*Stevia* is a genus of about 240 species of herbs and shrubs in the sunflower family (Asteraceae), native to subtropical and tropical South America and Central America.

The species *Stevia rebaudiana* Bertoni, commonly known as sweet leaf, sugarleaf, or simply *stevia*, is widely grown for its sweet leaves. The leaves have traditionally been used as a sweetener. Steviosides and rebaudiosides are the major constituents of glycosides found in the leaves of the *stevia* plant.

Over 100 phytochemicals have been discovered in *stevia*. It is rich in terpenes and flavonoids. Of these eight glycosides, stevioside is considered the sweetest and has been tested to be approximately 300 times sweeter than sugar. Stevioside, comprising 6-18% of the *stevia* leaf, is also the most prevalent glycoside in the leaf. Other sweet constituents include steviolbioside, rebaudiosides A-E, and dulcoside A.

*Stevia* extracts generally contain a high percentage of the glycosides of the diterpene steviol. The leaves of *stevia rebaudiana* contain over 10 different steviol glycosides. Steviol glycosides are considered high intensity sweeteners (about 250-300 times that of sucrose) and have been used for several years in a number of countries as a sweetener for a range of food products. Stevioside and rebaudioside A are the principal sweetening compounds and generally accompanied by smaller amounts of other steviol glycosides. The taste quality of rebaudioside A is better than stevioside, because of increased sweetness and decreased bitterness (Phytochemistry 68, 2007, 1855-1863).

The structures and chemical abstract service registry numbers for steviol and its glycosides that are the main sweetening agents of the additive steviol glycosides are shown below:

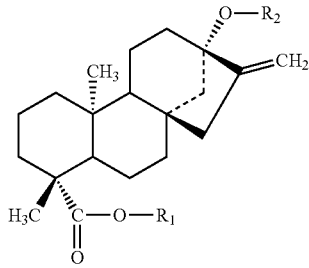

| | Compound name | C.A.S. No. | $R_1$ | $R_2$ |
|---|---|---|---|---|
| 1 | Steviol | 471-80-7 | H | H |
| 2 | Steviolbioside | 41093-60-1 | H | β-Glc-β-Glc(2→1) |
| 3 | Stevioside | 57817-89-7 | β-Glc | β-Glc-β-Glc(2→1) |
| 4 | Rebaudioside A | 58543-16-1 | β-Glc | β-Glc-β-Glc(2→1)\|β-Glc-(3→1) |
| 5 | Rebaudioside B | 58543-17-2 | H | β-Glc-β-Glc(2→1)\|β-Glc(3→1) |
| 6 | Rebaudioside C | 63550-99-2 | β-Glc | β-Glc-β-Rha(2→1)\|β-Glc(3→1) |
| 7 | Rebaudioside D | 63279-13-0 | β-Glc-β-Glc(2→1) | β-Glc-β-Glc(2→1)\|β-Glc(3→1) |
| 8 | Rebaudioside E | 63279-14-1 | β-Glc-β-Glc(2→1) | β-Glc-β-Glc(2→1) |
| 9 | Rebaudioside F | 438045-89-7 | β-Glc | β-Glc-β-Xyl(2→1)\|β-Glc(3→1) |
| 10 | Rubusoside | 63849-39-4 | β-Glc | β-Glc |
| 11 | Dulcoside A | 64432-06-0 | β-Glc | β-Glc-α-Rha(2→1) |
| 12 | Rebaudioside M (also known as Rebaudioside X) | 1220616-44-3 | (β-glc)$_2$-β-glc- | (β-glc)2-β-glc- |

As a sweetener and sugar substitute, rebaudioside A has a slower onset and longer duration than that of sugar, and be deemed very close to sucrose, although some of its extracts may have a bitter or licorice-like aftertaste at high concentrations. All steviol glycosides are bitter, some in less degree and some in greater degree.

The relationship between steviol glycoside mixtures, solubility, and how solubility of these mixtures affects the overall taste profile of *stevia* sweeteners has not been studied in detail.

Therefore, a need for steviol glycosides or a *stevia* glycoside composition with superior solubility exists in the food and beverage industry.

BRIEF SUMMARY OF THE INVENTION

An embodiment is presented that surprisingly provides a steviol glycoside or a steviol glycoside composition and/or a *stevia* sweetener in combination with a ratio of less than 1 mole of a cyclodextrin ("CD"), such as alpha, beta, and/or gamma cyclodextrin to 1 mole steviol glycoside(s) (<1 cyclodextrin:1 steviol glycoside(s) on a molar basis) with significantly improved solubility over steviol glycosides in the absence of a cyclodextrin under identical solubilizing conditions. The long term solubility in water of the present composition is greatly improved over previously reported *stevia* compositions without the inclusion of a cyclodextrin, such as gamma-cyclodextrin at ratios of less than 1 of a cyclodextrin to one or more steviol glycosides on a molar basis.

Another embodiment of the present invention is directed to a process for preparing a steviol glycoside or a steviol glycoside composition and/or a *stevia* sweetener in combination with a ratio of less than 1 mole of a cyclodextrin, such as gamma-cyclodextrin to 1 mole steviol glycoside(s) with significantly improved long term solubility in water over previously reported *stevia* compositions, especially without the inclusion of a cyclodextrin.

Yet another embodiment of the present invention is directed to a concentrated aqueous *stevia* sweetener solution with high concentration of steviol glycoside or steviol glycoside compositions that includes a cyclodextrin, such as gamma-cyclodextrin with a molar ratio of <1:1 cyclodextrin to steviol glycoside or steviol glycoside compositions.

DETAILED DESCRIPTION

In order to improve the taste of steviol glycosides, researchers have attempted to develop various compositions of steviol glycosides, in particular those with solubilizers.

US Patent Publication 2011/0195161 (U.S. Ser. No. 13/022,727) discloses inclusion complexes comprising a substantially pure terpene glycoside (greater than or equal to 95% pure) and at least one cyclodextrin, in particular gamma-cyclodextrin, wherein the solubility of the inclusion complex is greater than the solubility of the substantially pure terpene glycoside alone where the ratio of the terpene glycoside to cyclodextrin is 1:1 or greater, e.g. 1:20 and the solubility of the complex is increased from 1% to 300%.

*Solubility Enhancement of Steviol Glycosides and Characterization of Their Inclusion Complexes with Gamma-Cyclodextrin*, Int. J. Mol. Sci. 2011, 12, 7529-7553 discloses the mechanism of the solublization effects of the inclusion complexes. The results indicated that the steviol glycosides were clearly in inclusion complex formation with the gamma cyclodextrin which also results in solubility enhancement of these steviol glycosides. Phase solubility studies showed that amounts of soluble rebaudioside A, C and D increased with increasing amounts of gamma cyclodextrin indicating formation of 1:1 stoichiometric and higher order inclusion complexes. It was believed that the solublization effect was achieved only when the ratio of gamma cyclodextrin to steviol glycoside(s) was equal or greater than 1:1.

Cyclodextrins are a family of compounds made up of sugar molecules bound together in a ring, cyclic oligosaccharides. They are composed of 5 or more alpha-D-glucopyranoside units linked 1->4, as in amylose. Cyclodextrins are also referred to as cycloamyloses.

In view of the above research, it was surprisingly discovered, that the solublization effect can be achieved when the molar ratio of a cyclodextrin, such as gamma cyclodextrin to steviol glycoside is less than 1:1 (<1:1). Not to be limited by theory, it is believed that the steviol glycoside and cyclodextrin form a inclusion complex that has a ratio of less than one or more steviol glycoside(s) to a cyclodextrin on a molar basis. The term "inclusion complex" should include that the two or more molecules simply associate with each other via hydrostatic interactions, hydrogen bonding, Van der Waals interactions and the like. It should not be inferred that the term inclusion complex is limiting. Rather, it has been surprisingly found that ratios of less than 1:1 provide increased solubilities of the steviol glycoside(s) in the presence of a cyclodextrin. The term "complex" or "inclusion complex" is used interchangeably throughout this application to denote the compositions described herein where there is less than one mole of a steviol glycoside to one mole of a cyclodextrin.

Therefore, suitable molar ratios and ranges span the molar ratios of from about 0.1:1 to about 0.999:1 including all ratios and ranges between such values. These include, for example from about 0.1:<1 to about 0.999:1, from about 0.1 to about 0.99, from about 0.1 to about 0.98, from about 0.1 to about 0.97, from about 0.1 to about 0.96, from about 0.1 to about 0.95, from about 0.1 to about 0.94, from about 0.1 to about 0.93, from about 0.1 to about 0.92, from about 0.1 to about 0.91, from about 0.1 to about 0.9, from about 0.1 to about 0.89, from about 0.1 to about 0.88, from about 0.1 to about 0.87, from about 0.1 to about 0.86, from about 0.1 to about 0.85, from about 0.1 to about 0.84, from about 0.1 to about 0.83, from about 0.1 to about 0.82, from about 0.1 to about 0.81, from about 0.1 to about 0.8, from about 0.1 to about 0.79, from about 0.1 to about 0.78, from about 0.1 to about 0.77, from about 0.1 to about 0.76, from about 0.1 to about 0.75, from about 0.1 to about 0.74, from about 0.1 to about 0.73, from about 0.1 to about 0.72, from about 0.1 to about 0.71, from about 0.1 to about 0.7, from about 0.1 to about 0.69, from about 0.1 to about 0.68, from about 0.1 to about 0.67, from about 0.1 to about 0.66, from about 0.1 to about 0.65, from about 0.1 to about 0.64, from about 0.1 to about 0.63, from about 0.1 to about 0.62, from about 0.1 to about 0.61, from about 0.1 to about 0.6, from about 0.1 to about 0.59, from about 0.1 to about 0.58, from about 0.1 to about 0.57, from about 0.1 to about 0.56, from about 0.1 to about 0.55, from about 0.1 to about 0.54, from about 0.1 to about 0.53, from about 0.1 to about 0.52, from about 0.1 to about 0.51, from about 0.1 to about 0.5, from about 0.1 to about 0.49, from about 0.1 to about 0.48, from about 0.1 to about 0.47, from about 0.1 to about 0.46, from about 0.1 to about 0.45, from about 0.1 to about 0.44, from about 0.1 to about 0.43, from about 0.1 to about 0.42, from about 0.1 to about 0.41, from about 0.1 to about 0.4, from about 0.1 to about 0.39, from about 0.1 to about 0.38, from about 0.1 to about 0.37, from about 0.1 to about 0.36, from about 0.1 to about 0.35, from about 0.1 to about 0.34, from about 0.1 to about 0.33, from about 0.1 to about 0.32, from about 0.1 to about 0.31, from about 0.1 to about 0.3, from about 0.1 to about 0.29, from about 0.1 to about 0.28, from about 0.1 to about 0.27, from about 0.1 to about 0.26, from about 0.1 to about 0.25, from about 0.1 to about 0.24, from about 0.1 to about 0.23, from about 0.1 to about 0.22, from about 0.1 to about 0.21, from about 0.1 to about 0.2, from about 0.1 to about 0.19, from about 0.1 to about 0.18, from about 0.1 to about 0.17, from about 0.1 to about 0.16, from about 0.1 to about 0.15, from about 0.1 to about 0.14, from about 0.1 to about 0.13, from about 0.1 to about 0.12, and from about 0.1 to about 0.11. Ranges further include from about 0.11 to about 0.88, from about 0.12 to about 0.87, etc. including from about 0.12 to about 0.87, from about 0.13 to about 0.86, etc. including from about 0.14 to about 0.85, etc. from about 0.15 to about 0.84, etc. including ascending values and ranges to 0.99 inclusive.

Alternatively, the molar ranges can be from about 0.15 to about 0.99, from about 0.15 to about 0.98, from about 0.15 to about 0.97, from about 0.15 to about 0.96, from about 0.15 to about 0.95, from about 0.15 to about 0.9, from about 0.15 to about 0.85, from about 0.15 to about 0.8, from about 0.15 to about 0.75, from about 0.15 to about 0.7, from about 0.15 to about 0.65, from about 0.15 to about 0.6, from about 0.15 to about 0.55, from about 0.15 to about 0.5, from about 0.15 to about 0.45, from about 0.15 to about 0.4, from about 0.15 to about 0.35, from about 0.15 to about 0.3, from about 0.15 to about 0.25, from about 0.15 to about 0.2.

It should be understood that all molar ranges from 0.1 to 0.999 are included, such as, for example, from about 0.2 to 0.999, from about 0.3 to about 0.9, from about 0.4 to about 0.75, from about 0.25 to about 0.95, from about 0.2 to about 0.7, from about 0.35 to about 0.6, etc. and all values and ranges there between.

Additionally, the above noted ratios of a cyclodextrin to a steviol glycoside or steviol glycoside compositions are in aqueous solutions, the stability of the complex between the cyclodextrin to a steviol glycoside or steviol glycoside composition remains stable for at least 24 hours over a temperature range from about 0° C. to about 100° C. That is, there is no noted precipitation, crystallization or heterogeneity noted in the aqueous mixture.

The aqueous solution solubility of the complexes described herein have an increased solubility versus non-complexed steviol glycoside(s) of at least 1% to about 300% as compared to the noncomplexed steviol glycoside(s). In particular, the increased solubility (when compared to non-complexed steviol glycoside(s) compositions) is from 1% to 300%, from 2% to 298%, from 3% to 297%, from 4% to 296%, from 5% to 295%, from 6% to 294%, from 7% to 293%, from 8% to 292%, from 9% to 291%, from 10% to 290%, from 11% to 289%, from 12% to 288%, from 13% to 287% and from 14% to 286%, and so forth to from 140% to 160%, and all ranges therebetween, for example from 10% to 50%, from 20% to 60%, from 30% to 70%, from 40% to 80%, from 50% to 90%, from 60% to 100%, etc and all ranges and subranges, inclusive, from 1% to 300%.

The complexes described herein, wherein the molar ratio of CD to a steviol glycoside or a steviol glycoside composition is less than 1:1, have solubilities from about 1% by weight to about 90% by weight in an aqueous solution, more particularly from about 5% (e.g. 8%) by weight to about 90% by weight, from about 10% by weight to about 80% by weight, from about 15% by weight to about 70% by weight, from about 20% by weight to about 60% by weight, from about 30% by weight to about 50% by weight, from about 40% by weight to about 45% by weight and all ranges and values between 1% by weight to 90% by weight inclusive, including for example, from about 8% by weight to 20% by weight, from about 12% by weight to about 32% by weight, etc.

It was also discovered, surprisingly, that there is a synergistic effect in solublization between combinations of steviol glycosides, in particular inclusion complexes, of two or more steviol glycosides and solubilizers.

The long term solubility of the current embodiments differentiate over initial or short term solubility. The solubility disclosed throughout the present disclosure is "long term solubility", not "initial solubility" as described in the field. In other words, the solutions of the present invention remain homogenous for a long period of time, without crystallization, precipitation, or solution heterogeneity. Generally long term solubility described herein is from at least 1 day to greater than 5 years, from about 5 days to about 2 years, and more particularly from about 30 days to about 1 year.

Even though the steviol glycosides or steviol glycoside compositions complexed or associated with a cyclodextrin, such as gamma-cyclodextrin, are directed to having long term solubility at ambient temperature in an aqueous solution, the current embodiments can remain stable at temperatures that range from 0° C. to 25° C. Even though the range of stability of the current embodiments is directed to stability between 0° C. to 25° C., stability outside this range can also be expected especially at temperatures above this range. For example, from about 0° C. to about 100° C., from about 10° C. to about 90° C., from about 20° C. to about 40° C., from about 20° C. to about 25° C., and all temperatures and ranges there between, for example, from about 1° C. to about 99° C., from about 5° C. to about 45° C., from about 15° C. to about 25° C., from about 17° C. to about 22° C., etc.

Another embodiment further discloses that the solubility of a first steviol glycoside can be further improved by adding a second steviol glycoside to the combination of the first steviol glycoside and a solublizer, such as a cyclodextrin, e.g., gamma-cyclodextrin. Another embodiment further discloses that the solubility of a first and a second steviol glycoside can be further improved, by adding a third steviol glycoside to the combination of the first and the second steviol glycoside and a solublizer, such as a cyclodextrin, e.g., gamma-cyclodextrin.

In a further aspect, one embodiment provides a *stevia* glycoside or a *stevia* glycoside composition, together with a solublizer such as a cyclodextrin, e.g., gamma-cyclodextrin, wherein the total content of the *stevia* glycosides is improved in comparison with the maximum total content of *stevia* glycosides wt/wt in water under identical conditions without the inclusion of the solublizer. For example, the total content of the *stevia* glycosides in an aqueous solution at ambient temperature, comprising a *stevia* glycoside or a *stevia* glycoside composition with a cyclodextrin, e.g., gamma cyclodextrin, according to the present invention, wherein the molar ratio of cyclodextrin to *stevia* glycoside or a *stevia* glycoside composition is <1:1, provides that the combination of the components provides a complex or an associated material, wherein the complex or material is ≥1% wt/wt in water, preferably ≥5% wt/wt in water, more preferably ≥10% wt/wt in water, more preferably ≥15% wt/wt in water, more preferably ≥22% wt/wt in water, more preferably ≥25% wt/wt in water, more preferably ≥23% wt/wt in water, more preferably ≥35% wt/wt in water, more preferably ≥24% wt/wt in water, more preferably ≥45% wt/wt in water, and preferably ≥50% wt/wt in water, and most preferably about 10% wt/wt in water.

It should be understood that all ranges from ≥1% wt/wt in water to 60% wt/wt in water are included, such as, for example, from about 10% wt/wt in water to about 60% wt/wt in water, from about 20% wt/wt in water to about 60% wt/wt in water, from about 30% wt/wt in water to about 60% wt/wt in water, etc. and all values and ranges there between.

In another embodiment the treated steviol glycoside(s) or steviol glycoside composition with the cyclodextrin, such as gamma cyclodextrin, may be solubilized in a water/alcohol solution. The alcohol can be methanol, ethanol, propanol, isopropanol, n-butanol, isobutanol, sec-butanol, tert-butanol, n-pentanol, isopentanol, neopentanol, or combinations thereof.

The water alcohol solution can be less than 60% alcohol, less than 50% alcohol, less than 40% alcohol, less than 30% alcohol, less than 20% alcohol, less than 10% alcohol, less than 5% alcohol, less than 2% alcohol, or less than 1% alcohol by volume.

An advantage of the present embodiments is, for example, that less gamma-cyclodextrin is required to solubilize steviol glycoside(s) that what has previously been reported. Since gamma-cyclodextrin is expensive, the reduction of the amount of gamma cyclodextrin is important to the commercial success of such compositions disclosed herein and provides an advantage over compositions that require great than a 1:1 ratio of gamma cyclodextrin to steviol glycoside(s).

In the specification and in the claims, the terms "including" and "comprising" are open-ended terms and should be interpreted to mean "including, but not limited to . . . ". These terms encompass the more restrictive terms "consisting essentially of" and "consisting of."

It must be noted that as used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", "characterized by" and "having" can be used interchangeably.

Unless defined otherwise, all technical and scientific terms used herein have the same meanings as commonly understood by one of ordinary skill in the art to which this invention belongs. All publications and patents specifically mentioned herein are incorporated by reference in their entirety for all purposes including describing and disclosing the chemicals, instruments, statistical analyses and methodologies which are reported in the publications which might be used in connection with the invention. All references cited in this specification are to be taken as indicative of the level of skill in the art. Nothing herein is to be construed as an admission that the invention is not entitled to antedate such disclosure by virtue of prior invention.

The phrase "steviol glycoside" is recognized in the art and is intended to include the major and minor constituents of *stevia*. These include, but are not limited to, components of *stevia* such as Steviol, Steviolbioside, Stevioside, Rebaudioside A (RA), Rebaudioside B (RB), Rebaudioside C (RC), Rebaudioside D (RD), Rebaudioside E (RE), Rebaudioside F (RF), Rebaudioside M (RM, also referred to as Rebaudioside X, RX), Rubusoside, Ducoside A (DA) and mixtures thereof.

The steviol glycoside(s) can be polymorphic. In one embodiment, the polymorph can be a solvate or a hydrate. The solvate can be formed with an alcohol, such as methanol or ethanol. Additionally, the steviol glycoside(s) can be anhydrous.

The phrase "*stevia* containing sweetener" is intended to include any composition that is prepared from a *stevia* plant, such as a *stevia* extract, or the individual components found in *stevia*. The sweetener can include one or more of the components associated with the *stevia* plant, such as those noted above. The sweetener can also include one or more conventional artificial or natural sweeteners, such as sucrose, fructose, maltose, lactose, xylitol, sorbitol, dextrose, glucose, mannitol, aspartame, inulin, sucralose, acesulfame-K, sodium cyclamate, inulin, erythritol, thaumatin, arabinose, glatactose, mannose, rhamnose, xylose, trehalose, raffinose, cellobiose, tagatose, DOLCIA PRIMA™ allulose, and mogroside, or any other substances that have a sweet taste. The artificial or natural sweetener can be in any form, for example, but limited to a salt, a hydrate, a polymorph, or amorphous.

A "steviol glycoside composition" as referred to herein, pertains to a material that is a mixture and includes two or more previously purified steviol glycosides found in the *stevia* plant. The steviol glycoside compositions can include, for example, RA+CD, RB+CD, RD+CD, RA+RB+CD, RA+RD+CD, RB+RD+CD and RA+RB+RD+CD.

The steviol glycoside or the components of the steviol glycoside composition can be "substantially pure", that is having a purity of 95% or greater. In other embodiments, the purity of the components can be less than 95%, such as 90%, 85%, 80%, 75%, 70%, 65%, 60%, 55%, 50%, etc. but can still be combined with a cyclodextrin to increase solubility of the ultimate complex.

The steviol glycoside compositions noted herein can be used as a sugar substitute alone or in combination with a food product (also known as a foodstuff).

The steviol glycosides or steviol glycoside compositions noted herein can be used in beverages, broths, and beverage preparations selected from the group comprising carbonated, non-carbonated, frozen, semi-frozen ("slush"), non-frozen, ready-to-drink, concentrated (powdered, frozen, or syrup), dairy, non-dairy, herbal, non-herbal, caffeinated, non-caffeinated, alcoholic, non-alcoholic, flavored, non-flavored, vegetable-based, fruit-based, root/tuber/corm-based, nut-based, other plant-based, cola-based, chocolate-based, meat-based, seafood-based, other animal-based, algae-based, calorie enhanced, calorie-reduced, and calorie-free products, optionally dispensed in open containers, cans, bottles or other packaging. Such beverages and beverage preparations can be in ready-to-drink, ready-to-cook, ready-to-mix, raw, or ingredient form and can use the *stevia* composition as a sole sweetener or as a co-sweetener.

The steviol glycoside(s) or steviol glycoside compositions noted herein can be used in foods and food preparations (e.g. sweeteners, soups, sauces, flavorings, spices, oils, fats, and condiments) from dairy-based, cereal-based, baked, vegetable-based, fruit-based, root/tuber/corm-based, nut-based, other plant-based, egg-based, meat-based, seafood-based, other animal-based, algae-based, processed (e.g. spreads), preserved (e.g. meals-ready-to-eat rations), and synthesized (e.g. gels) products.

Such foods and food preparations can be in ready-to-eat, ready-to-cook, ready-to-mix, raw, or ingredient form and can use the *stevia* compositions as a sole sweetener or as a co-sweetener.

The steviol glycosides or steviol glycoside compositions noted herein can be used in candies, confections, desserts, and snacks selected from the group comprising dairy-based, cereal-based, baked, vegetable-based, fruit-based, root/tuber/corm-based, nut-based, gum-based, other plant-based, egg-based, meat-based, seafood-based, other animal-based, algae-based, processed (e.g. spreads), preserved (e.g. meals-ready-to-eat rations), and synthesized (e.g. gels) products. Such candies, confections, desserts, and snacks can be in ready-to-eat, ready-to-cook, ready-to-mix, raw, or ingredient form, and can use the *stevia* based compositions as a sole sweetener or as a co-sweetener.

The steviol glycoside(s) or steviol glycoside compositions noted herein can be used in prescription and over-the-counter pharmaceuticals, assays, diagnostic kits, and therapies selected from the group comprising weight control, nutritional supplement, vitamins, infant diet, diabetic diet, athlete diet, geriatric diet, low carbohydrate diet, low fat diet, low protein diet, high carbohydrate diet, high fat diet, high protein diet, low calorie diet, non-caloric diet, oral hygiene products (e.g., toothpaste, mouthwash, rinses, floss, toothbrushes, other implements), personal care products (e.g. soaps, shampoos, rinses, lotions, balms, salves, ointments, paper goods, perfumes, lipstick, other cosmetics), professional dentistry products in which taste or smell is a factor (e.g. liquids, chewables, inhalables, injectables, salves, resins, rinses, pads, floss, implements), medical, veterinarian, and surgical products in which taste or smell is a factor (e.g. liquids, chewables, inhalables, injectables, salves, resins, rinses, pads, floss, implements), and pharmaceutical compounding fillers, syrups, capsules, gels, and coating products.

The steviol glycoside(s) or steviol glycoside compositions noted herein can be used in consumer goods packaging materials and containers selected from the group comprising plastic film, thermoset and thermoplastic resin, gum, foil, paper, bottle, box, ink, paint, adhesive, and packaging coating products.

The steviol glycoside(s) or steviol glycoside compositions noted herein can be used in goods including sweeteners, co-sweeteners, coated sweetener sticks, frozen confection sticks, medicine spoons (human and veterinary uses), dental instruments, presweetened disposable tableware and utensils, sachets, edible sachets, potpourris, edible potpourris, artificial flowers, edible artificial flowers, clothing, edible clothing, massage oils, and edible massage oils.

The steviol glycoside(s) or steviol glycoside compositions noted herein can also be used with "artificial sweeteners". Artificial sweeteners are those, other than sucrose, such as cyclamates and salts thereof, sucralose, aspartame, saccharin and salts thereof, *stevia* (Truvian™), rebaudioside A, xylitol, acesulfame-K, neotame, N—[N-[3-(3-hydroxy-4-methoxyphenyl)propyl]-alpha-aspartyl]-L-phenylalanine 1-methyl ester (hereinafter abbreviated as "ANS9801"), glycyrrhizin, thaumatin, monellin and the like. The steviol glycoside(s) or steviol glycoside compositions noted herein masks, reduces or eliminates the aftertaste associated with the artificial sweetener, (e.g., *stevia*) such that the composition has a taste profile like sugar.

The following paragraphs enumerated consecutively from 1 through 20 provide for various aspects of the present invention. In one embodiment, in a first paragraph (1), the present invention provides a composition comprising a cyclodextrin and a steviol glycoside or a steviol glycoside composition, wherein the ratio of a cyclodextrin to steviol glycoside or the steviol glycoside composition is less than 1:1 on a molar basis.

2. The composition of paragraph 1, wherein the steviol glycoside is selected from Steviol, Steviolbioside, Stevioside, Rebaudioside A, Rebaudioside B, Rebaudioside C, Rebaudioside D, Rebaudioside E, Rebaudioside F, Rebaudioside M, Rubusoside, Ducoside A or mixtures thereof.

3. The composition of paragraph 2, wherein the steviol glycoside comprises Rebaudioside A.

4. The composition of paragraph 2, wherein the steviol glycoside comprises Rebaudioside B.

5. The composition of paragraph 2, wherein the steviol glycoside comprises Rebaudioside D.

6. The composition of paragraph 2, wherein the steviol glycoside composition comprises Rebaudioside A and Rebaudioside B.

7. The composition of paragraph 2, wherein the steviol glycoside composition comprises Rebaudioside A and Rebaudioside D.

8. The composition of paragraph 2, wherein the steviol glycoside composition comprises Rebaudioside B and Rebaudioside D.

9. The composition of paragraph 2, wherein the steviol glycoside composition comprises Rebaudioside A, Rebaudioside B and Rebaudioside D.

10. The composition of paragraph 1, further comprising one or more natural or artificial sweeteners selected from the group consisting of sucrose, fructose, maltose, lactose, xylitol, sorbitol, dextrose, glucose, mannitol, aspartame, inulin, sucralose, acesulfame-K, sodium cyclamate, inulin, erythritol, thaumatin, arabinose, glatactose, mannose, rhamnose, xylose, trehalose, raffinose, cellobiose, tagatose, DOLCIA PRIMA™ allulose, and mogroside.

11. The composition of any of paragraphs 1 through 10, wherein the cyclodextrin is alpha-cyclodextrin, beta-cyclodextrin, gamma-cyclodextrin or mixtures thereof.

12. The composition of any of paragraphs 1 through 11, wherein the steviol glycoside or steviol glycoside composition and cyclodextrin combination is stable in water or a water/alcohol solution for greater than 1 day.

13. The composition of any of paragraphs 1 through 12, wherein the ratio of cyclodextrin to steviol glycoside or steviol glycoside composition is less than 0.9:1.

14. The composition of any of paragraphs 1 through 13, wherein associated bitterness or aftertaste of the composition or composition and sweetener is reduced or eliminated from the composition in comparison to a steviol glycoside or a steviol glycoside composition without a cyclodextrin and, optionally, sweetener.

15. The composition of any of paragraphs 1 through 14, wherein the solubility of the cyclodextrin and the steviol glycoside or the steviol glycoside composition is from about 5% to about 90% by weight in an aqueous solution or an aqueous/alcohol solution.

16. A method for improving the solubility of a steviol glycoside or a steviol glycoside composition with a cyclodextrin in an aqueous solution in comparison to a steviol glycoside or a steviol glycoside composition not in the presence of a cyclodextrin, comprising the step of combining the steviol glycoside or a steviol glycoside composition with a cyclodextrin in an aqueous solution to form a complex, wherein the molar ratio of cyclodextrin to the steviol glycoside or steviol glycoside composition is less than 1:1.

17. The method of paragraph 16, wherein the steviol glycoside is selected from Steviol, Steviolbioside, Stevioside, Rebaudioside A, Rebaudioside B, Rebaudioside C, Rebaudioside D, Rebaudioside E, Rebaudioside F, Rebaudioside M, Rubusoside, Ducoside A or mixtures thereof and the cyclodextrin is alpha-cyclodextrin, beta-cyclodextrin, gamma-cyclodextrin or mixtures thereof.

18. The method of either paragraph 16 or 17, wherein the complex solubility is from about 5% to about 90% by weight in an aqueous solution or an aqueous/alcohol solution, and/or associated bitterness or aftertaste of the complex, optionally with a sweetener, is reduced or eliminated from the composition in comparison to a steviol glycoside or a steviol glycoside composition without a cyclodextrin and, optionally, the sweetener and/or the complex is stable in water or a water/alcohol solution for greater than 1 day.

19. A complex comprising a cyclodextrin and a steviol glycoside or a steviol glycoside composition, wherein the ratio of a cyclodextrin to steviol glycoside or the steviol glycoside composition is less than 1:1 on a molar basis, wherein the solubility of the complex is increased from 1% to 300% in an aqueous solution as compared to a noncomplexed steviol glycoside or steviol glycoside composition.

20. The complex of paragraph 19, wherein the complex has a solubility in an aqueous solution of from about 1% to about 90%.

The invention will be further described with reference to the following non-limiting Examples. It will be apparent to those skilled in the art that many changes can be made in the embodiments described without departing from the scope of the present invention. Thus the scope of the present invention should not be limited to the embodiments described in this application, but only by embodiments described by the language of the claims and the equivalents of those embodiments. Unless otherwise indicated, all percentages are by weight.

EXAMPLES

Raw Materials

| Component | Lot | RA (%) | RB (%) | RD (%) | Total stevia glycosides (%) |
|---|---|---|---|---|---|
| RA | EPC094-17-03 | 99.56 | — | — | — |
| RB | EPC006-30-03 | — | 99.3 | — | — |
| RD | EPC094-28-11 | — | — | 95.10 | — |
| RA + RD | CT001-131105 | 90.1 | — | 7.0 | 98.4 |

| Component | Lot | RA (%) | RB (%) | RD (%) | Total stevia glycosides (%) |
|---|---|---|---|---|---|
| RA + RB + RD | CT001-131108 | 79.8 | 10.3 | 6.3 | 96.8 |

RA=rebaudioside A
RB=rebaudioside B
RD=rebaudioside D

Example 1

Combination of RA and γ-cyclodextrin

| pH of the solution | Concentration of RA (weight %) | Amount of γ-cyclodextrin (mole ratio) | Total solid content (weight %) | stability* |
|---|---|---|---|---|
| neutral | 3.5% | 0 | 3.5% | 2 h |
| | 3.5% | 1 | 8.2% | 336 h |
| | 3.5% | 0.85 | 7.3% | 160 h |
| | 3% | 0.85 | 6.4% | 92 h |
| | 3% | 0.8 | 6.2% | 52 h |
| | 3% | 0.7 | 5.8% | 24 h |
| | 3% | 0.6 | 5.4% | 2 h |
| | 3% | 0.5 | 5.0% | 1 h |
| acidic | 3.5% | 1 | 8.2% | 120 h |

*the period that the system remains in solution form, without precipitation

Concentration of RA was weight (g) in 100 g of water.

The molar amount of RA was calculated by molecular weight (967). The ratio was calculated by moles of gamma-cyclodextrin/moles of RA.

The total solid content was calculated by the total weight of RA+gamma-cyclodextrin, wherein the weight of gamma-cyclodextrin was calculated by moles and molecular weight (1297).

The stability test was performed at ambient temperature (25° C.), and was in water.

The acidic aqueous conditions were formulated with citric acid and water, and the pH was 3.0.

Conclusions:
1. The solubility of gamma-cyclodextrin/RA improved as the ratio approached 1:1. The ratio is mole/mole (gamma-cyclodextrin/RA). Not to be limited by theory, it is believed that RA is embedded in cyclodextrin. It was unexpected that the solublization effect can be achieved when the ratio is <1, in particular in the cases of *stevia* compositions, e.g. RA+RD and RA+RB+RD, noted below.
2. Under acidic condition, the stability of the solution was decreased, in comparison with neutral condition.

Example 2

Combination of RA+RD and Gamma-cyclodextrin

| pH of the solution | Concentration of RA + RD (weight %) | Amount of γ-cyclodextrin (mole ratio) | Total solid content (weight %) | stability* |
|---|---|---|---|---|
| neutral | 3.5% | 0 | 3.5% | 96 h |
| | 3.5% | 0.9 | 7.67% | >30 days |
| | 3.5% | 1 | 8.1% | >30 days |
| | 3.5% | 2 | 12.8% | 121 h |
| | 5.5% | 0 | 5.5% | 240 h |
| | 5.5% | 1 | 12.8% | >30 days |
| acidic | 3.5% | 0.9 | 7.67% | >30 days |
| | 3.5% | 1 | 8.1% | >30 days |
| | 3.5% | 2 | 12.8% | 168 h |

*the period that the system remain a solution form, without precipitation

The "RA+RD" is listed in the table of "raw materials" (lot: CT001-131105).

Concentration of RA+RD was weight (g) in 100 g of water.

The moles of "RA+RD" was calculated based on the molecular weight of RA (967) and RD (1129) and the weight ratio of RA/RD (90.1:7.0) present, providing a calculated molecular weight of "RA+RD" of 979.

The total solid content was calculated by the total weight of "RA+RD"+gamma-cyclodextrin, wherein the weight of gamma-cyclodextrin was calculated by moles and the molecular weight (1297).

The stability test was performed at ambient temperature (25° C.) and was in water.

The acidic aqueous conditions were formulated with citric acid and water, and the pH was 3.0.

Conclusion:
1. The solubility of gamma-cyclodextrin/RA+RD improved as the ratio approached 1:1.
2. When the ratio reaches 2, it is believed that the stability of the solution is decreased due to the high concentration of gamma-cyclodextrin.
3. Under acidic conditions, the solublization effect of gamma-cyclodextrin to RA+RD is similar to that of RA in Example 1.

Example 3

Combination of RA+RB+RD and Gamma-cyclodextrin

| pH of the solution | Concentration of RA + RB + RD (weight %) | Amount of γ-cyclodextrin (mole ratio) | Total solid content (weight %) | stability* |
|---|---|---|---|---|
| neutral | 3.5% | 0 | 3.5% | 19 h |
| | 3.5% | 0.9 | 7.75% | >30 days |
| | 3.5% | 1 | 8.2% | >30 days |
| | 3.5% | 2 | 12.95% | 336 h |
| | 10% | 1 | 23.5% | >30 days |
| | 10% | 0 | 2.35% | 20 days |
| acidic | 3.5% | 0.9 | 7.75% | 520 h |
| | 3.5% | 1 | 8.2% | 264 h |
| | 3.5% | 2 | 12.95% | 168 h |

*the period that the system remain a solution form, without precipitation

The "RA+RB+RD" are listed in the table of "raw materials" (lot: CT001-131108).

Concentration of RA+RB+RD was weight (g) in 100 g of water.

The moles of "RA+RB+RD" was calculated based on the molecular weight of RA(967), RB(805) and RD(1129) and the weight ratio of RA/RB/RD (79.8:10.3:6.3) present, providing a calculated molecular weight of "RA+RB+RD" of 935.

The total solid content was calculated by the total weight of "RA+RB+RD"+gamma-cyclodextrin, wherein the weight of gamma-cyclodextrin was calculated by moles and molecular weight (1297).

The stability test was performed at ambient temperature (25° C.) and was in water.

The acidic aqueous conditions were formulated with citric acid and water, and the pH was 3.0.

Conclusion:
1. The solubility of gamma-cyclodextrin/RA+RB+RD improved as the ratio approached 1:1.
2. When the ratio reached 2, it is believed that the stability of the solution was decreased due to the high concentration of gamma-cyclodextrin.
3. Under acidic conditions, the solubility was significantly decreased in comparison to neutral condition, most likely due to the significant decrease of RB solubility in the acidic condition.

Example 4

Combination of Individual RB or RD and Gamma-cyclodextrin

| Component | Concentration (weight %) | Amount of γ-cyclodextrin (mole ratio) | Total solid content (weight %) | stability* |
|---|---|---|---|---|
| RB | 1% | 1 | 2.61% | 20 min |
| RD | 1% | 1 | 2.15% | 48 h |

*the period that the system remain a solution form, without precipitation

Concentration of RB or RD was weight (g) in 100 g of water.

The molar amount of RB or RD was calculated by molecular weight.

The ratio was calculated by moles of gamma-cyclodextrin/mole of RB or RD.

The total solid content was calculated by the total weight of RB or RD+gamma-cyclodextrin, wherein the weight of gamma-cyclodextrin was calculated by moles and molecular weight (1297).

The stability test was performed at ambient temperature (25° C.) and was in water.

Conclusion:
The solublization of gamma-cyclodextrin with individual RB or RD was noted. At concentrations of 1%, individual RB or RD did not form a solution without a solublizer, such as a cyclodextrin, for example, gamma-cyclodextrin.

Example 5

The combinations according to Examples 1-3 were dissolved in purified water (pH=7), to obtain solutions with concentrations, based on total *stevia* glycoside content, of 800 ppm, and taste profiles of these solutions were evaluated.

Results:
RA
Pure RA had a significant bitter taste, while the combination of RA+gamma-cyclodextrin had greatly decreased bitter taste, as well as improved onset speed, resulting in a better sweetness profile for all noted molar ratios of gamma-cyclodextrin/RA.

RA+RD
RA+RD had a bitter aftertaste and slow onset, while the bitter aftertaste was greatly decreased by adding gamma-cyclodextrin at molar ratios of 0.9, 1 and 2 of gamma-cyclodextrin to RA+RD.

RA+RB+RD
RA+RB+RD had a little bitter taste but had a (metallic) aftertaste, while the aftertaste was greatly improved by adding gamma-cyclodextrin at molar ratios of 0.9, 1 and 2 of gamma-cyclodextrin to RA+RB+RD.

Conclusion:
Gamma-cyclodextrin had a masking effect on bitter taste and aftertaste of *stevia* glycosides and the effect was noted where the ratio of cyclodextrin to a steviol glycoside or a steviol glycoside composition is less than 1:1 on a molar basis.

Example 6

RA/RB composition (Lot#: EPC137-08-01, RA 78.12%, RB 19.35%) and gamma-CD (RA/RB:gamma-CD=1:0.9 mole ratio).

| Solid/Liquid ratio | Dissolution property at room temperature | Stability |
|---|---|---|
| 0.5% | soluble | >5 d |
| 1.0% | soluble | >5 d |
| 5.0% | soluble | >5 d |
| 8.0% | soluble | >5 d |

*due to time limit, the stability test was carried out only for 5 days.

RA/RB composition (Lot#: EPC137-08-01, RA 78.12%, RB 19.35%) and gamma-CD (RA/RB:gamma-CD=1:0.8 mole ratio).

| Solid/Liquid ratio | Dissolution property at room temperature | Stability |
|---|---|---|
| 0.5% | soluble | >5 d |
| 1.0% | soluble | >5 d |
| 5.0% | soluble | >5 d |
| 8.0% | soluble | >5 d |

*due to time limit, the stability test was carried out only for 5 days.

Conclusion: gamma-CD can significantly improve the stability of the solution of RA/RB composition even its mole amount is less than that of the RA/RB composition (a molar ratio of <1:1 cyclodextrin to steviol glycoside composition).

Although the present invention has been described with reference to preferred embodiments, persons skilled in the art will recognize that changes may be made in form and detail without departing from the spirit and scope of the invention. All references cited throughout the specification, including those in the background, are incorporated herein in their entirety.

Those skilled in the art will recognize, or be able to ascertain, using no more than routine experimentation, many equivalents to specific embodiments of the invention described specifically herein. Such equivalents are intended to be encompassed in the scope of the following claims.

What is claimed is:
1. A composition consisting essentially of gamma-cyclodextrin and at least two steviol glycosides,
    wherein the ratio of cyclodextrin to the at least two steviol glycosides is from 0.4:1 to 0.75:1 on a molar basis,
    wherein the stability of the composition in water is increased under neutral pH conditions in comparison to compositions having a ratio of cyclodextrin to the at least two steviol glycosides of greater than 1:1.1 on a molar basis, wherein the at least two steviol glycosides are (1) Rebaudioside A and Rebaudioside D, or (2) Rebaudioside A, Rebaudioside B and Rebaudioside D, and wherein the at least two steviol glycosides are the only steviol glycosides in the composition.

2. The composition of claim 1, wherein the composition is stable in water for greater than 1 day.

3. The composition of claim 1, wherein a bitterness or aftertaste associated with the composition is reduced or eliminated in comparison to a steviol glycoside composition without cyclodextrin.

4. The composition of claim 1, wherein the solubility of the composition is from about 10% to about 90% by weight in water.

* * * * *